(12) United States Patent
Damigella (10) Patent No.: US 11,786,070 B2
(45) Date of Patent: Oct. 17, 2023

(54) LOW POWER LIQUID PURIFIER (71) Applicant: BEDFORD SYSTEMS LLC, Bedford, MA (US)

(72) Inventor: Joseph Damigella, Boxford, MA (US)

(73) Assignee: Bedford Systems LLC, Bedford, MA (US)

( * ) Notice: Subject to any disclaimer, the term of this patent is extended or adjusted under 35 U.S.C. 154(b) by 102 days.

(21) Appl. No.: 17/222,117

(22) Filed: Apr. 5, 2021

(65) Prior Publication Data

US 2021/0219774 A1 Jul. 22, 2021

Related U.S. Application Data (63) Continuation of application No. 16/362,340, filed on Mar. 22, 2019, now Pat. No. 10,993,579.

(60) Provisional application No. 62/646,663, filed on Mar. 22, 2018.

(51) Int. Cl.
A47J 31/60 (2006.01)
C02F 1/32 (2023.01)
A47J 31/46 (2006.01)

(52) U.S. Cl.
CPC ............... A47J 31/60 (2013.01); A47J 31/46 (2013.01); C02F 1/325 (2013.01); C02F 2201/3222 (2013.01); C02F 2301/028 (2013.01); C02F 2303/04 (2013.01); C02F 2307/12 (2013.01)

(58) Field of Classification Search
CPC ................ C02F 1/32; C02F 1/48; A47J 31/46
See application file for complete search history.

(56) References Cited

U.S. PATENT DOCUMENTS

| 4,676,896 A | 6/1987 | Norton | |
|---|---|---|---|
| 2015/0114912 A1* | 4/2015 | Taghipour | C02F 1/325 210/748.14 |
| 2015/0129776 A1 | 5/2015 | Boodaghians et al. | |

(Continued)

FOREIGN PATENT DOCUMENTS

| EP | 1440941 B1 | 9/2006 |
|---|---|---|
| EP | 2747618 B1 | 9/2015 |

(Continued)

OTHER PUBLICATIONS

European Search Report of EP Application No. 19770415.8 dated Aug. 31, 2021.

(Continued)

Primary Examiner — Walter D. Griffin
Assistant Examiner — Cameron J Allen
(74) Attorney, Agent, or Firm — Dorsey & Whitney LLP (57) ABSTRACT Described herein includes sample liquid purification apparatus, systems, and techniques of use. The purification apparatus generally can operate to reduce a temperature of a precursor liquid within a beverage machine or appliance. For example, a thermally conductive body can define a heat sink having a tortuous path for propagation of the precursor therethough, facilitating temperature reduction. The purification apparatus can further generally operate to sanitize or otherwise reduce a level of contaminants in the precursor liquid. For example, an energy source, such as a light emitting diode, can be arranged or integrated with the thermally conductive body to emit ultraviolet radiation toward the precursor liquid within the thermally conductive body.

18 Claims, 9 Drawing Sheets (56) References Cited

U.S. PATENT DOCUMENTS

2017/0233269 A1  8/2017  Mohanty et al.
2017/0369334 A1  12/2017  Park et al.

FOREIGN PATENT DOCUMENTS

JP  2016203095 A  12/2016
WO  2017124191 A1  7/2017

OTHER PUBLICATIONS

International Search Report and Written Opinion for International Application No. PCT/US2019/023554, dated Jul. 4, 2019.

* cited by examiner

LOW POWER LIQUID PURIFIER

CROSS-REFERENCE TO RELATED APPLICATION

This patent application is a continuation of U.S. patent application Ser. No. 16/362,340 filed Mar. 22, 2019, which is a non-provisional patent application of, and claims priority to, U.S. Provisional Application No. 62/646,663 filed Mar. 22, 2018, and titled "Low Power Liquid Purifier," the disclosures of which are hereby incorporated herein by reference in their entireties.

FIELD

The present disclosure relates to systems and method for water treatment, and more particularly, to treating water in preparation for use in a beverage machine.

BACKGROUND

Beverage machines can use water as a precursor medium for producing a beverage. The water can include contaminants that generally detract from the quality of the precursor medium and resulting beverage. Water can also exhibit an elevated temperature that can be undesirable for chilled beverages. Traditional systems that employ replaceable filters can be bulky and ineffective, reducing the likelihood of repeatable or prolonged use. Thus, the need continues for improved purification techniques that improve water quality with minimal maintenance.

SUMMARY

Low power liquid purifiers and methods of use are disclosed herein. The purifier generally operates to reduce both microbes (or other containments) and a temperature of a precursor liquid. The purifier, also referred to herein as the "liquid purification apparatus," can take many forms to accomplish the foregoing in the context of a beverage machine. For example, the purifier can include a thermally conductive body that defines a tortuous path of the precursor liquid. The thermally conductive body can be or otherwise include a heat sink, thereby allowing the thermally conductive body to remove at least some heat from the precursor liquid as it progresses along the tortuous path. An energy source, such as an LED or other light element, can be integrated with the thermally conductive body, in order to emit radiation or other energy into the tortuous path for sanitization of the precursor liquid.

Many embodiments of a liquid purification apparatus are described herein. For example, in an embodiment, a liquid purification apparatus is disclosed. The liquid purification apparatus includes a thermally conductive body at least partially defining a liquid inlet, a liquid outlet, and a tortuous path for a precursor liquid. The tortuous path can extend from the liquid inlet to the liquid outlet. The liquid purification apparatus can further include an energy source integrated with the thermally conductive body, and configured to introduce energy to the precursor liquid along the tortuous path.

In another embodiment, the thermally conductive body can include a heat sink arranged to reduce a temperature of the precursor liquid along the tortuous path. The energy source can include a light source configured to emit ultraviolet radiation. The thermally conductive body can include an optically transparent window defining an optical path from an exterior of the thermally conductive body to the tortuous path.

In another embodiment, the ultraviolet radiation can be tuned for propagation through the optical region, and microbial reduction of precursor liquid that is in optical communication with the optically transparent window. In some examples, the tortuous path can include a bend. The inlet and the outlet can be disposed on different sides of the thermally conductive body. Additionally, a cover can define the liquid inlet, the liquid outlet, and the tortuous path with the thermally conductive body.

In another embodiment, a liquid purification apparatus is disclosed. The liquid purification apparatus can include a heat sink that defines an internal channel therethough. The heat sink can include an optical region configured to receive light and direct the light to the internal channel. The liquid purification apparatus can include an energy source optically coupled with the optical region and responsive to a flow of precursor liquid through the internal channel.

In another embodiment, the liquid purification apparatus includes a processor. The liquid purification apparatus can further include a memory component in communication with the processor and containing programmed instructions that, when accessed, cause the processor to activate the energy source when the precursor liquid is flowing through the internal channel. In this regard, the programmed instructions, when access by the processor, can also cause the processor to deactivate the ultraviolet radiation source when the precursor liquid stops flowing through the liquid channel.

In another embodiment, the heat sink can include a first half and a second half. The first and second halves can cooperate to define the internal channel through the heat sink. The internal channel can be configured to route a precursor liquid along multiple directions within the heat sink. The internal channel can include two or more bends, thereby defining a tortuous path through the heat sink.

In another embodiment, the optical region can include an optically transparent window. In this regard, the energy source can include an ultraviolet light connected to the heat sink at the optical region.

In another embodiment, a method for treating precursor liquid in a beverage machine is disclosed. The method includes receiving a flow of precursor liquid at an opening of a liquid purification apparatus. The method further includes causing flow of the precursor liquid through a tortuous path of the liquid purification apparatus. The tortuous path can be at least partially defined by a heat sink. The method further includes reducing a microbial count of the precursor liquid along the tortuous path using an energy source integrated with the heat sink along the tortuous path.

In another embodiment, the operation of reducing can include emitting ultraviolet radiation through an optically transparent window of the heat sink, the optically transparent window in optical communication with the tortuous path. The energy source can include a light emitting diode.

In another embodiment, the operation of causing flow includes reducing a temperature of the precursor liquid using the heat sink. In this regard, the tortuous path can be defined by a plurality of bends formed within the heat sink.

In addition to the exemplary aspects and embodiments described above, further aspects and embodiments will become apparent by reference to the drawings and by study of the following description.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. Often, the width of an object is transverse the object's length.

An appliance can be used to prepare beverages. In some examples, the appliance is a brewing machine that prepares beverages like coffee, tea, hot chocolate, cider, and the like. In other examples, the appliance is a machine used to mix the ingredients for carbonated drinks, fruit drinks, milk products, alcoholic drinks, other types of drinks, or combinations thereof.

It is uncommon for a household appliance to cool and store potable water for extended periods of time because of the resources required to maintain and store potable water at low temperatures. The present disclosure includes a system for cleaning water in a quick and efficient manner, allowing the water to be used in forming a beverage. In some examples, the water can also be cooled through the same process. After cleaning, the water can be transferred to a carbonation vessel, into a user's cup for drinking, to a location for cooking, to a location for food preparation, to another source, or combinations thereof. Keeping the water cool is desirable for those drinks that are more enjoyable when cooled. In some situations, the cool temperature of the water assists with keeping the microbe populations in the water low.

In some examples, the appliance does not track or record liquid (e.g., precursor liquid such as water) age or when liquid was introduced into the appliance. The appliance can similarly lack a record of microbiological content of the liquid. And further, liquid entering the appliance can vary in quality. For example, some of the water can be dirty, contain unhealthy levels of bacterial populations, be relatively clean, have other types of characteristics, or combinations thereof. However, regardless of the initial liquid quality, the systems and techniques described herein can subject the liquid to conditions that cool and clean the liquid. In alternative examples, the liquid's characteristics can be measured and the conditions applied to the liquid by the system can be variable based on the measured conditions.

In some examples, the system can maintain clean liquid inside the appliance until the liquid is desired for drinking. In other examples, the system can clean and/or cool the liquid at some time before the liquid is desired for use. In some of those situations, the liquid can be cleaned just before the liquid is desired for use.

The liquid added to the appliance can vary in temperature. In some circumstances, it can be desirable to cool the liquid from room temperature down to below 5 degrees Celsius in a predetermined amount of time. In some examples, the predetermined amount of time can be less than 2 hours, less than 90 minutes, less than 1 hour, less than 30 minutes, or less than another appropriate amount of time.

The cooling and cleaning of the liquid can be accomplished through a food safe body that is liquid tight and made of a thermally conductive material. Warm liquid can enter one end of a channel formed in the body, flow through the channel transferring heat away from the liquid. In some examples, the channel is convoluted or tortuous, which can increase the length of the channel in the thermally conductive material, increase the surface area of the channel in contact with the liquid, or combinations thereof. The increased length and/or increased surface area can increase the amount of heat transferred from the liquid into the thermally conductive body. The thermally conductive body can sufficiently cool the liquid by optimizing the balance between the surface area and the flow, thereby maximizing the internal surface area for heat transfer and allowing for optimal flow.

At a location along the channel, radiant energy is introduced into the flowing liquid, killing liquid borne microbes at the rate at which the liquid flows. The radiant energy can be ultraviolet light. In some examples, the ultraviolet light can be from a light emitting diode (LED) source, which uses a low amount of power. The low power of the LED can help mitigate heat generated from the energy source.

The thermally conductive material can also assist in drawing away any temperature increases that would otherwise affect the liquid from the radiant energy source. The rate of microbial decrease can be directly tied to the flow rate of the liquid. In some examples, to increase the exposure to the liquid at the radiant source, the flow is slowed down to increase the amount of radiant energy per volumetric unit of liquid as the liquid passes. In this type of example, the microbial decrease can be improved with the increased radiant concentration. In some examples, the radiant source includes an excess capacity to kill the microbial population as the liquid passes. In this situation, the flow rate can be increased to speed up the microbial decrease. The thermally conductive body can maintain a low temperature by directly cooling the ultraviolet LED energy source or another type of radiant energy source. This can prevent a need for an additional static heat exchanger directly in contact with the ultraviolet LED, the thermally conductive body, or another location in the system.

In some embodiments, a controller that includes software, firmware, hardware, and/or programmed instructions can control when the liquid is flowing. In some examples, the radiant energy source is only turned on when liquid is flowing. When liquid stops flowing, programmed instructions of the controller can turn the radiant energy source off. Turning the energy source off when no liquid is flowing can conserve energy, but it can also prevent a heat build-up in the channel that can rise the temperature of the liquid in the channel. In some examples, a sensor is incorporated into the sensor to determine when liquid is flowing. This type of sensor can be a binary sensor that senses only when liquid is flowing or not. In other situations, the sensor can also measure the liquid's flow rate or another characteristic of the liquid's flow. In another example, the liquid can be caused to flow by a motor, a pump, or another type of device. Such a device that causes the liquid to flow can be in communication with the radiant energy source and can communicate when the liquid is caused to flow and when the liquid is not flowing. This can be accomplished by sending a signal that indicates when the liquid flow starts or stops. In other examples, the device can continuously send a signal when the liquid is flowing. In other examples, the device can send signals to instruct the radiant energy source when to activate. In some situations, the amount of radiant energy applied to the channel is variable and the liquid's flow rate is variable. In one example, the flow rate device can communicate with the radiant energy source about how much energy to input into the system, and the radiant energy source can instruct the flow rate device on how fast to flow the liquid.

In some examples, all the materials of the system can be ultraviolet degradation resistant. In some examples, just those components in the thermally conductive body are made with ultraviolet degradation resistant materials and/or coatings.

The radiant energy source can be applied to the thermally conductive body in any appropriate manner. For example, the radiant energy source can be disposed within a cavity formed within the body. In some examples, the radiant energy source is attached to the outside of the body and angled to project the energy into the inlet or outlet of the channel. In yet another example, the body defines just a portion of the channel and a cover is securable to the body to complete the formation of the channel. In other words, the body and the cover can collectively define at least a portion of the channel. In some of these examples, the cover can also be made of a thermally conductive material. In some examples, the cover can include a reflective material to reflect any heat generated by the radiant energy source towards the thermally conductive material to be transferred away from the liquid. In some examples, the radiant energy source is isolated from making contact with the liquid. In one type of example, the radiant energy source can be transmitted into the channel through an optically transparent window. As an example, an ultraviolet LED source can radiate through an acrylic window into the channel formed in the thermally conductive material.

The liquid can circulate thought the channel multiple times during the cooling and purifying process. In some examples, the liquid continuously flows through the channel with the radiant energy source being applied to the channel. In other examples, the liquid is run through the system for a predetermined amount of time before being classified by the system as purified. In yet another example, the liquid is passed through the channel just once before being classified by the system as purified.

In some examples, the thermally conductive body can include a heat sink. The heat sink can include a geometry that promotes an exchange of heat with the surrounding environment. For example, at least a portion of the thermally conductive body can include fins with a geometry to dissipate heat as the air passes over the fins. In some examples, a fan can direct air to the fins, the outside surface of the thermally conductive body, or another portion of the system to assist with drawing heat from the thermally conductive body. In other examples, the thermally conductive body can be actively cooled in at least another way. In other examples, no active cooling and/or specific geometries are used to increase the rate of thermal dissipation in the thermally conductive body.

Figure 1:
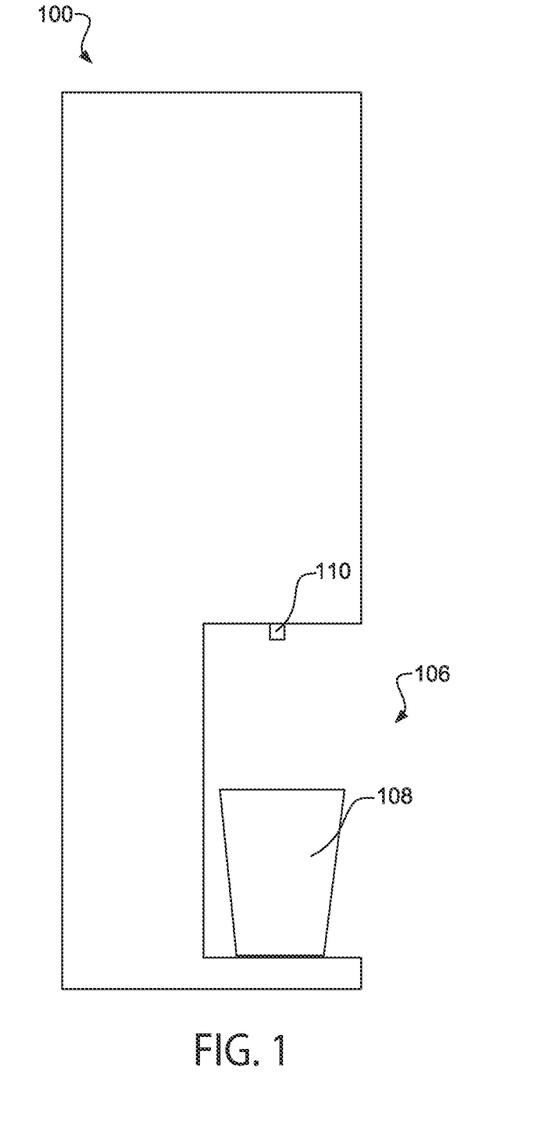
FIG. 1 depicts a side-view of an appliance in accordance with aspects of the present disclosure.

Now referring to specific examples with the figures, FIG. 1 depicts a general side-view example of an appliance 100 that is used to make beverages. The appliance 100 can include a dispensing area 106 that is capable of holding a cup 108 and a nozzle 110 that can dispense a beverage into the cup 108.

In some examples, the appliance 100 includes a pod receiver (not shown) that holds a pod containing a beverage medium. The beverage medium can include ingredients used to make a certain type of beverage. The pod can be placed into the pod receiver when the user desires to prepare a beverage. The appliance 100 can use the contents of the pod to make a drink. Liquid to make the drink can be supplied to the appliance by the user who can add liquid into a reservoir. With the user supplying the liquid, the liquid's source and/or quality can be unknown. The liquid supplied by the user can include a population of microbes that can be killed or at least reduced with the liquid purification system described in the present disclosure. In some examples, liquid can be supplied to the appliance 100 from an infrastructure system incorporated into a building.

In some examples, carbon dioxide, nitrogen, or another type of gas can be added to the liquid and/or the beverage medium to make the drink. The gas can be added to the reservoir containing the liquid, and the gas can be subjected to the same cooling and purifying conditions that the liquid is subjected to. In other examples, the gas is added to the liquid after the cooling and purifying process is at least partially completed. In yet other examples, the beverage medium is mixed with the liquid prior to subjecting the liquid to the cooling and purifying conditions. As a result, bacteria or other microbes present in the beverage medium can be cleaned and cooled with the liquid. In some examples, multiple types of beverage mediums can be used to make the drink. For example, the appliance can cause a powder, a syrup, milk, and other ingredients to the drink to be mixed. In these examples, all of the ingredients can be run through the cooling and purifying system, just some of the ingredients are run through the cooling and purifying system, or just the liquid is run through the cooling and purifying system.

Figure 2:
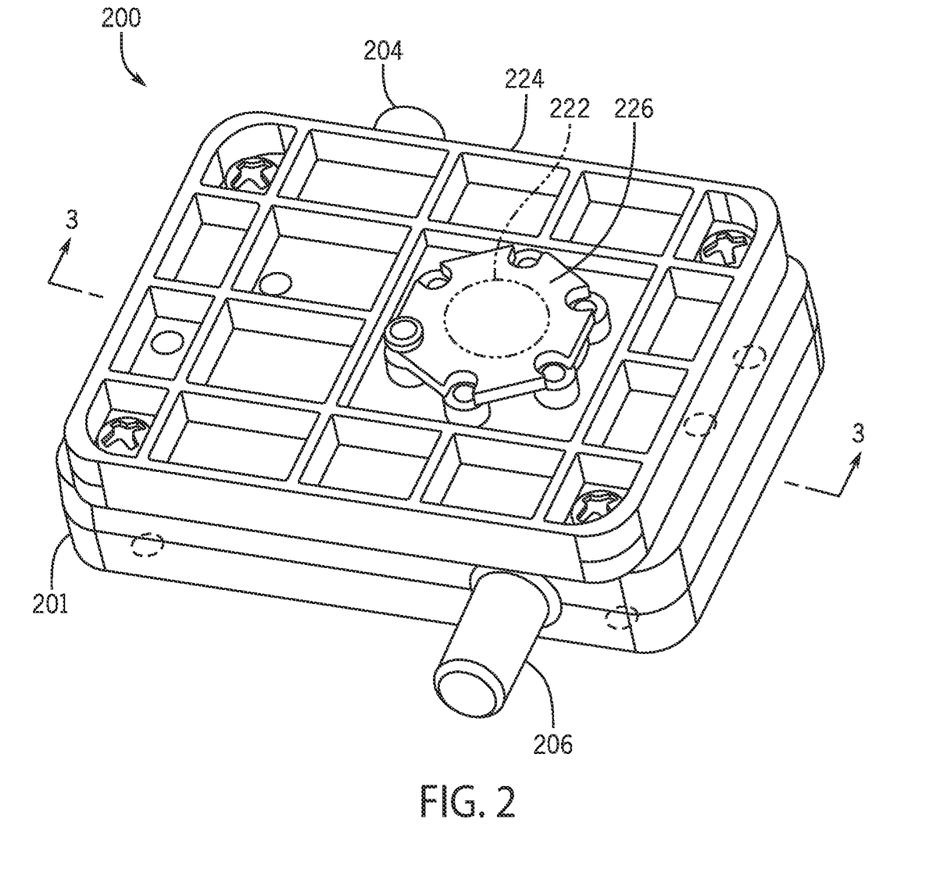
FIG. 2 depicts a perspective view of a liquid purification apparatus having a thermally conductive body and a cover plate in accordance with aspects of the present disclosure.

FIG. 2 depicts an example liquid purification apparatus 200. As shown in FIG. 2, the liquid purification apparatus 200 can include a thermally conductive body 201 and a cover 224. The thermally conductive body 201 and the cover 224 can cooperate to define a tortuous path for a precursor liquid through the liquid purification apparatus 200, such as from an inlet 204 to an outlet 206. The liquid purification apparatus 200 can also include a radiant energy source 222 (shown in phantom in FIG. 2) that can be integrated with, and positioned along, the tortuous path. The radiant energy source 222, in some embodiments, can be secured to one or both of the thermally conductive body 201 or the cover 224 using and/or under a plate 226.

Figure 3:
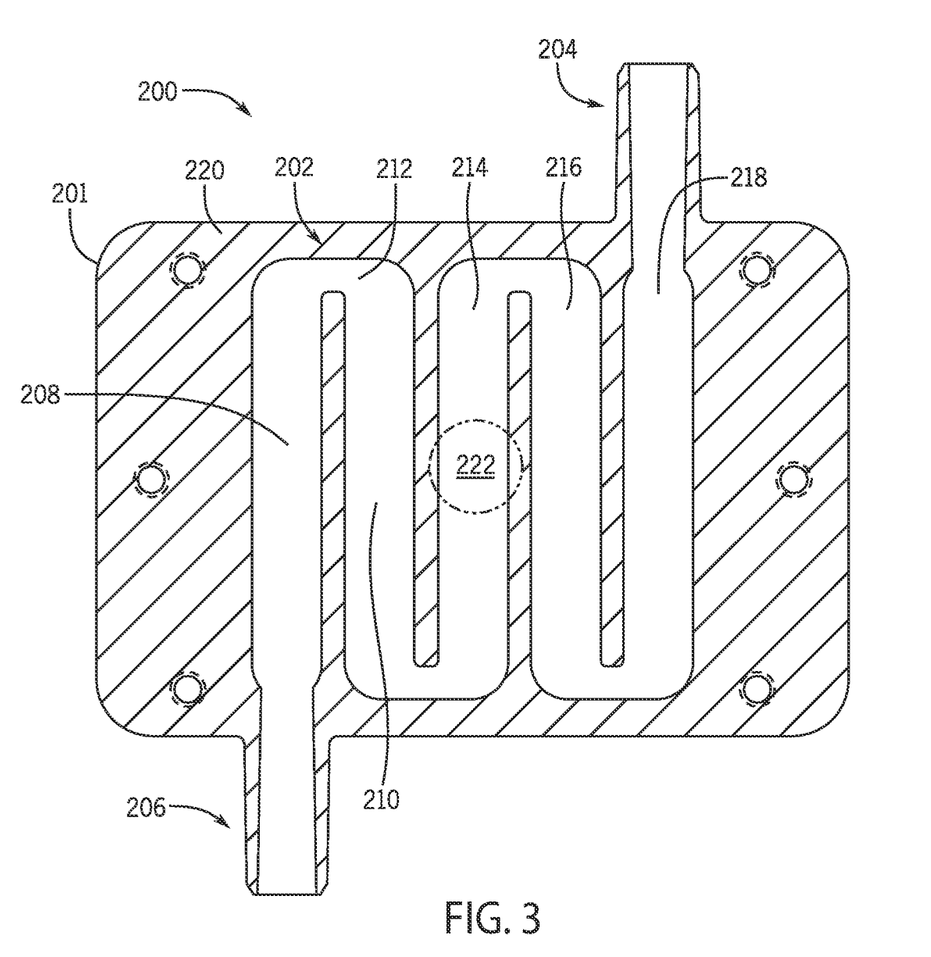
FIG. 3 depicts a cross-sectional view of the liquid purification apparatus of FIG. 2, taken along line 3-3 of FIG. 2.

FIG. 3 depicts a cross-sectional view of the thermally conductive body 201 shown in FIG. 2, taken along line 3-3 of FIG. 2. In this example, the thermally conductive body 201 defines part of a channel 202 that defines a tortuous path for liquid, such as the precursor liquid described herein for beverage production. The liquid can enter into the channel 202 through the inlet 204 and exit through the outlet 206. In the depicted example, the channel 202 is convoluted to include multiple portions. A first portion 208 of the channel 202 can be aligned to a second portion 210 of the channel 202 and joined by a bend 212. The bend 212 can be a section of the channel 202 that is transversely oriented to both the first and second portions 208, 210 of the channel. In the example of FIG. 3, there are five portions 208, 210, 214, 216, 218 that are aligned with each other. In other examples, the channel 202 can include more or fewer portions that are aligned with each other. While this example includes a specific arrangement of the portions of the liquid channel, any appropriate arrangement can be used in accordance with the principles described in this disclosure. For example, the channel 202 can include just a single straight line from the inlet 204 to the outlet. In other examples, the channel 202 is convoluted by following a tortuous path, as illustrated in FIG. 3. In other examples, the convoluted channel 202 can include spiral sections, diagonal sections, asymmetric sections, other types of sections, or combinations thereof.

In this example, the channel 202 is defined with a recess formed in the face 220 of the thermally conductive body 201. In other examples, the channel 202 is formed entirely within the thickness of the thermally conductive body 201. Forming a channel 202 completely within the thickness of the body can be accomplished by casting the thermally conductive body 201 around material that forms the channel, but can be easily removed after the thermally conductive material has cured. In the example of FIG. 3, the grooves can be formed through a subtractive process, such as by milling out the grooves after a flat face 220 has been formed. In other examples, the cover and/or thermally conductive body are formed with an additive process where the grooves are defined during the additive process. A cover can be secured to the face 220 of the thermally conductive body. The cover can collectively define the channel 202 with the thermally conductive body. In some situations, the cover includes a flat surface that creates a volume with the recesses defined in the face 220 of the thermally conductive body.

The thermally conductive material can be any appropriate material that conducts thermal energy. In this regard, the thermally conductive body generally defines a heat sink that can remove at least some heat from liquid that travels the tortuous path defined by the channel 202. In one embodiment, the thermally conductive body can be formed from an aluminum material; however, in other examples, other thermally conductive materials are contemplated. The thermally conductive material can include pure aluminum, alloys of aluminum, mixtures of aluminum, or other types of materials with aluminum, or combination thereof. Other types of metal can also or alternatively be used as the thermally conductive material. Additionally, composites, certain types of plastic, or other types of material can be used as the thermally conductive material. In some examples, a thermally conductive coating can be applied to the portions of the body where the channel 202 exists. These coatings can be applied by spraying, sputtering, dipping, painting, vapor deposition techniques, electroplating, or other types of techniques to form a coating. In some examples, the coating can be applied to have a rough surface to increase surface area and or turbulence in the fluid, and thereby increase the thermal transfer between the liquid and thermally conductive body.

A radiant energy source 222 (shown in phantom in FIG. 3) can be placed at any appropriate location along the channel 202. In this example, the energy source 222 is depicted to be at a mid-center of the channel 202. Alternatively, the energy source 222 can be positioned in any of the aligned portions, at any of the bends, near the inlet, near the outlet, at another location, or combinations thereof. As liquid passes by the energy source 222, light or another type of energy can shine into the liquid killing bacteria or other types of microbes living in the liquid. In some examples, substantially all of the bacteria or other types of microbes are killed after a single pass with the energy source 222. Thus, liquid entering through the inlet 204 can have any level of contamination with microbe populations, but the liquid exiting can be cooled and purified. In other examples, the liquid can be recirculated after leaving the outlet 206 by being directed back to the inlet 204 to pass across the energy source 222 again. In some examples, this cycle repeats itself multiple times.

As the liquid passes through the channel, the liquid contacts the surface area of the channel. The heat in the liquid can be drawn out into the thermally conductive material. Thus, the liquid can be cooled as it travels through the channel. In some examples, the liquid can be cooled by at least 1 degree from when the liquid entered the channel 202 through the inlet 204 to when the liquid exits out of the outlet. But, the temperature drop can be any appropriate decrease in temperature. As an example, the liquid can drop in temperature by 1 degree Celsius, 2 degrees Celsius, 5 degrees Celsius, 10 degrees Celsius, 15 degrees Celsius, 25 degrees Celsius, another appropriate temperature drop, or combinations thereof after a single pass. In other examples, this temperature drop occurs after multiple cycles through the thermally conductive body.

Figure 4:
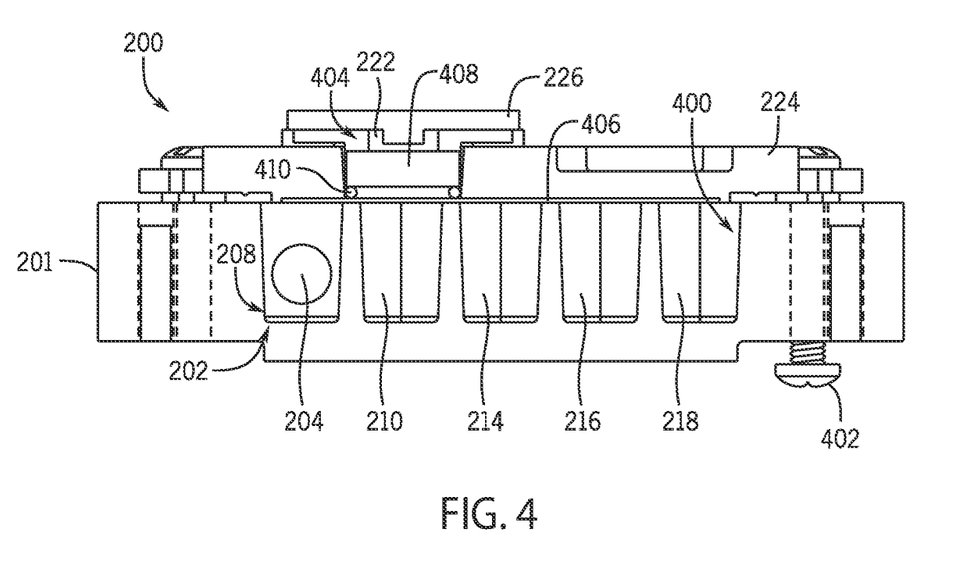
FIG. 4 depicts a cutaway cross-sectional view of a thermally conductive body and a cover plate in accordance with aspects of the present disclosure.

FIG. 4 depicts a cross-section of the liquid purification apparatus 200. As shown, the thermally conductive body 201 and the cover 224 cooperate to form the channel 202. In this example, the inlet 204 is visible through a first portion 208 of the channel, and the other portions 210, 214, 216, 218 of the channel 202 that are aligned are revealed in the cross section. The cover 224 is secured to the top portion 400 of the channel 202 by bolting the cover 224 to the thermally conductive body 201 with screws 402. In other examples, other types of fasteners can be used, such as nails, magnets, adhesives, clips, clamps, other types of fasteners, or combinations thereof. By securing the cover 224 with removable fasteners, such as screws, the cavity 404 is accessible to replace or otherwise provide maintenance to the energy source. Consequently, in those examples where the energy source 222 is a LED light, the plate 226 can be removed without having to remove the cover 224 to replace the LED light with another when appropriate.

In the illustrated example, the cover 224 includes a reflective surface 406 incorporated on an underside of the cover. This reflective surface 406 can reflect any heat existing within the in the liquid towards the thermally conductive material. In some examples, the cover 224 is also made of a thermally conductive material. However, the interface between the cover 224 and the thermally conductive body 201 can create a thermally conductive boundary that lowers the effective thermally conductivity between the thermally conductive body 201 and the cover 224. Thus, a greater thermally conductive dissipation can be realized through the integrally formed thermally conductive body 201 rather than through the cover 224.

A cavity 404 can be defined in the cover 224, and an optically transparent window 408 can be disposed within the cavity 404. The energy source 222 can be positioned behind the optically transparent window 408. When the energy is transmitted, the energy can travel through the optically transparent window 408 into the channel 202. The plate 226 can cause the energy source 222 to be held tightly against the optically transparent window 408. Additionally, an O-ring 410 or another type of seal element can be used to prevent liquid from escaping from the channel 202 into the cavity 404. With the plate 226 tightly secured to the cover 224, the plate 226 can impose a downward force on the optically transparent window 408 causing the seal element to be held in compression. This force can assist in forming the airtight seal between the cavity 404 and the channel 202.

In some examples, the optically transparent window 408 is made of an acrylic material. However, any appropriate type of material can be used. A non-exhaustive list of materials that can be used in the optically transparent window 408 include, but are not limited to, acrylics, glass, plastics, polymers, fiberglass, other types of material, or combination thereof. In some examples, the window 408 is semi-transparent and allows only a portion of the light from the energy source 222 to enter into the channel 202. In some examples, the window 408 filters out wavelengths of light that can cause heating in the channel 202, are ineffective in killing microbes, or that are otherwise counterproductive.

Figure 5:
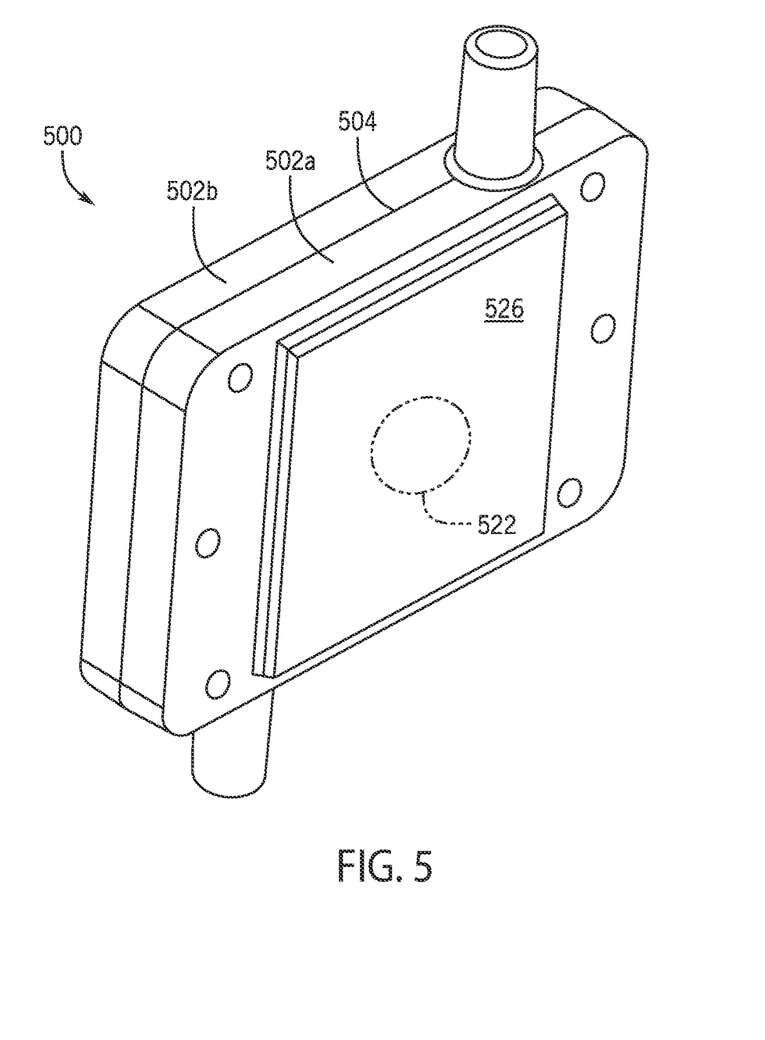
FIG. 5 depicts a perspective view of a thermally conductive body in accordance with aspects of the present disclosure.

FIG. 5 depicts a water purification apparatus 500. The water purification apparatus 500 can be substantially analogous to the water purification apparatus 500 described above with respect to FIGS. 2-4. In the embodiment of FIG. 5, the water purification apparatus 500 includes a thermally conductive body having a first thermally conductive body half 502a and a second thermally conductive body half 502b joined at an interface 504. In this regard, an internal channel or other tortuous path defined through the water purification apparatus 500 can be defined at least partially by each of the first and second thermally conductive body halves 502a, 502b. In this example, an energy source 522 (shown in phantom) is integrated with the water purification apparatus 500 below a plate 526 that is secured to the first thermally conductive body half 502a. In other examples, the radiant energy source 522 can be integrated with the second thermally conductive body half 502b.

Figure 6:
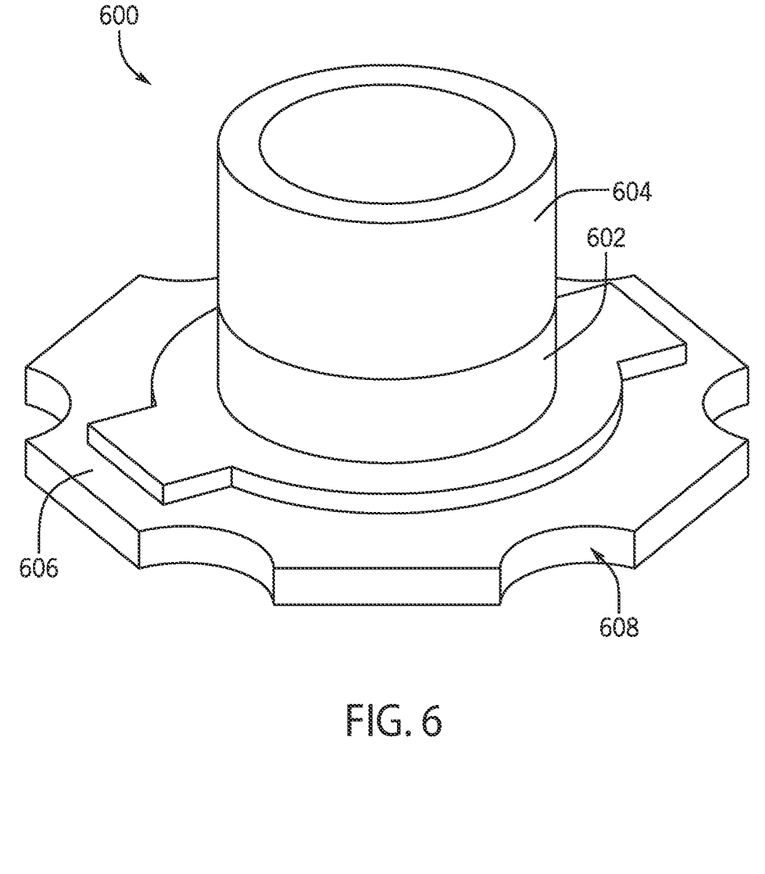
FIG. 6 is a perspective view of an energy source including an optically transparent window in accordance with aspects of the present disclosure.

FIG. 6 depicts an example of an energy source 600. The energy source 600 can be or define a component of the radiant energy source 222 and/or 522, described above with respect to FIGS. 2-5. The energy source 600 is a LED light 602 that projects ultraviolet radiation. The LED light 602 can be positioned between the window 604 and the plate 606 that secures the LED light 602 to the cover. Cut-outs 608 in the plate 606 can define, in part, a space to thread fasteners, such as screws, to secure the plate 606 to the cover. To replace the LED light 602, the fasteners can be removed from the plate 606, and the user can pull up on the plate 606 to pull the plate 606 away from the cover. With the plate 606 removed from the cover, the assembly containing the LED light 602 is accessible within the cavity for removal.

Figure 7:
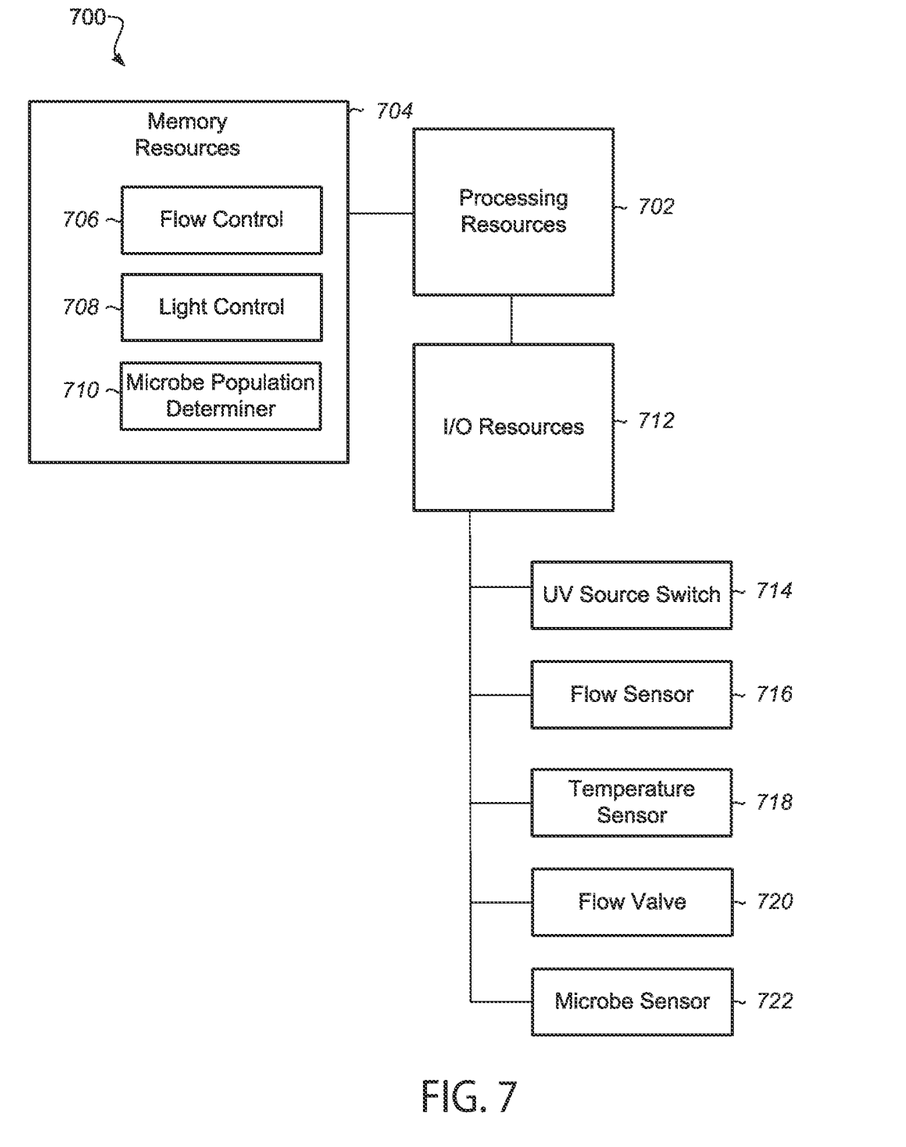
FIG. 7 is a system block diagram of a purification system in accordance with aspects of the present disclosure.

FIG. 7 illustrates a block diagram of an example of a purification system 700 in accordance with the present disclosure. The purification system 700 can include a combination of hardware and programmed instructions for executing the functions of the purification system 700. In this example, the purification system 700 includes processing resources 702 that are in communication with memory resources 704. Processing resources 702 include at least one processor and other resources used to process the programmed instructions. The memory resources 704 represent generally any memory capable of storing data such as programmed instructions or data structures used by the purification system 700. The programmed instructions and data structures shown stored in the memory resources 704 include a flow control 706, a light control 708, and a microbe population determiner 710.

Input/output (I/O) resources 712 are in communication with the processing resources 702. The I/O resources 712 can include any appropriate type of mechanism for communicating with remote devices. For example, the I/O resources 712 can include a transmitter, a wireless transmitter, a receiver, a transceiver, a port for receiving an external memory, a network interface, another I/O resource, or combinations thereof.

The I/O resources can be in communication with any appropriate device. In the illustrated example, the I/O resources 712 are in communication with an ultraviolet source switch 714, a flow sensor 716, a temperature sensor 718, a flow valve 720, a microbe sensor 722, another device, or combinations thereof. These devices can be located in the appliance, can be independent of the appliance, can be in communication with the I/O resources over a network, or combinations thereof.

The processing resources 702 can include one or more processors. The processing resources can include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some examples, the processing resources can be configured to operate a memory array using a memory controller. In other examples, a memory controller can be integrated into the processor. The processing resources can be configured to execute computer-readable instructions stored in a memory to perform various functions (e.g., function or tasks supporting overlaying exercise information on a remote display).

An I/O controller (not shown) can manage input and output signals for the system and the appliance. Input/output control components can also manage peripherals not integrated into the system and/or appliance. In some examples, the input/output control component can represent a physical connection or port to an external peripheral. In some examples, I/O controller can utilize an operating system such as iOS®, ANDROID®, MS-DOS®, MS-WINDOWS®, OS/2®, UNIX®, LINUX®, or another known operating system.

Memory resources 704 can include random access memory (RAM) and read only memory (ROM). The memory can store computer-readable, computer-executable software including instructions that, when executed, cause the processor to perform various functions described herein. In some examples, the memory resources can contain, among other things, a Basic Input-Output system (BIOS) which can control basic hardware and/or software operation such as the interaction with peripheral components or devices.

The flow control 706 represents programmed instructions that, when executed, cause the processor to control the flow of the liquid through the channel. The flow control 706 can be in communication with the flow valve. In some examples, the flow control 706 can also be in communication with a pump or another type of device that causes liquid to move. The flow control can cause the flow valve to open, allowing liquid to enter the inlet of the channel. In examples where the liquid is pressurized behind the flow valve, the liquid can enter into the channel. In other examples, the flow control can open a valve and activate a device to cause the liquid to flow, such as a pump. In some examples, the flow control causes the valve to open or close upstream of the inlet. In other examples, the flow control causes the valve to open or close downstream of the outlet. By closing off a valve downstream of the outlet, liquid backs up in the channel stopping the liquid flow. In some examples, the downstream valve can be partially closed to back up the liquid while still allowing liquid to flow through the channel. In some examples with the liquid backed up from the partial closure of a downstream valve, the entire capacity of the channel can be filled as the liquid flows there through. Regardless of whether the valve is located downstream or upstream of the channel, the flow can be adjusted by changing the amount that the flow valve is opened.

The flow control can cause the liquid to start flowing and stop flowing, such as by opening and closing the valve. In some examples, the amount of flow can be variable. For example, the valve can be configured to open just partially, thereby throttling the flow somewhere between a full flow rate and a zero flow rate. In other case, the device that causes the liquid to flow can have multiple outputs that cause the liquid to flow at different rates.

The light control 708 represents programmed instructions that, when executed, cause the processor to control the light to shine into the channel in those examples where a light is the radiant energy source. The light control 708 can cause the light to shine when the liquid is flowing and/or when the liquid starts flowing. The light control 708 can cause the light to turn off when the liquid discontinues flowing and/or when the liquid is not flowing.

The light control 708 can cause the ultraviolet source switch 714 to cause the radiant energy source to give off light. In some examples, the light control 708 can be in communication with a flow sensor 716 that determines when and/or if the liquid is flowing. For example, the flow sensor 716 can be a rod that protrudes into the channel and measures a side load imposed on the rod. In those situations where the rod measures a side load, the flow sensor can generate an output indicating that the liquid is flowing. Conversely, in those situations where the rod does not measure a side load, the flow sensor can generate an output or fail to generate an output at all indicating that no liquid is flowing. In those examples where the system incorporates a flow sensor, the flow sensor can be disposed at any appropriate location. For example, a flow sensor can be disposed within the channel, outside the channel, adjacent the inlet, adjacent the outlet, adjacent the flow valve, adjacent the radiant energy source, within an aligned portion of the channel, within a bend of the channel, upstream of the thermally conductive body, downstream of the thermally conductive body, at another location, or combinations thereof.

In some examples, a temperature sensor can be used to determine a flow rate. In some examples, the thermally conductive material can change temperature based on whether liquid is flowing through the channel or not.

In some examples, no flow valve can be used. In such an example, the flow control can cause the processor to send instructions to the light control based on commands that have been sent from the flow control.

In some examples, the light control emits a constant energy level into the liquid. In other examples, the light control can vary its intensity based on the flow rate of the liquid through the channel. In one example, the intensity of the radiant energy can be higher in those examples where the flow rate is higher. In other examples, the radiant energy can be lower in those examples where the flow rate is lower. Further, in those examples where the microbe population is measured and the measurement includes a large population, the light intensity can be increased. The radiant energy source's intensity can be varied by varying the amount of power supplied to the source. In other examples, a shutter within the cavity in which the radiant energy source is disposed can have an ability to partially obstruct at least some of the radiant energy from traveling through the optically transparent window.

In some examples, the purification system 700 can include a microbe population determiner 710. The microbe population determiner 710 represents programmed instructions that, when executed, cause the processor to determine the microbe population. The microbe population determiner 710 can cause measurements to be made of different characteristics of the liquid to determine the microbe population or a risk of a microbe population. Based on the determinations, the flow rate can be slowed down to allow the liquid to have more time exposed to the radiant energy. In other examples where the indicators suggest that the microbe population can be small, the liquid can be allowed to pass through the thermally conductive body at a faster rate thereby receiving less exposure to the radiant energy.

Figure 8:
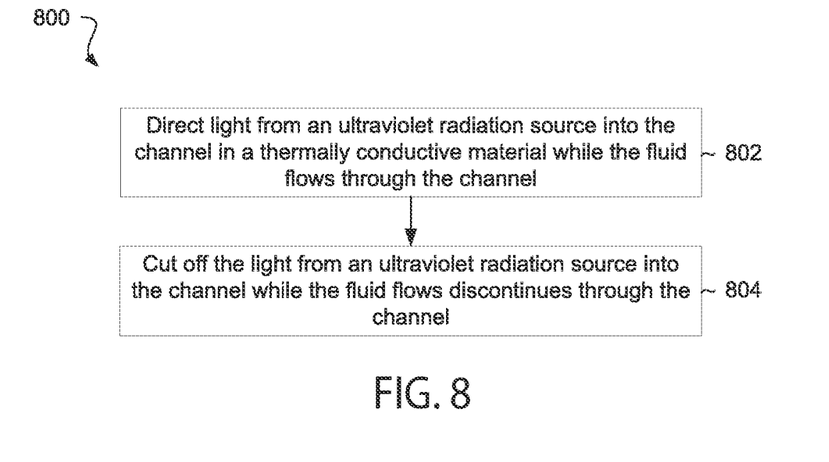
FIG. 8 is an exemplary flow chart of a method of using a purification system in accordance with aspects of the present disclosure.

FIG. 8 shows a flowchart illustrating a method 800 of purifying a liquid. The operations of method 800 can be implemented by any of the purification systems described in FIGS. 1-7 or their components as described herein. In some examples, the purification system can execute a set of instructions to control the components of the device to perform the functions described below. Additionally or alternatively, the purification system, appliances, or other devices can perform aspects the functions described below using special-purpose hardware. In this example, the method 800 includes directing light from an ultraviolet radiation source into a channel in a thermally conductive material while the liquid flows through the channel 202, and cutting off the light from the ultraviolet radiation source into the channel while the liquid flow discontinues through the channel 202.

At block 802, light is directed from an ultraviolet radiation source into the channel when the liquid is flowing. The light can be switched on in response to a command from a sensor or a device that indicates that liquid is flowing through the channel. The light kills microbes, if any, that exist in the liquid. In some examples, the liquid that enters the channel in the thermally conductive material is purified with the ultraviolet radiation source before the liquid exits the outlet of the channel.

At block 804, light from the ultraviolet radiation source is cut off from entering the channel. Thus, the liquid in the channel is not exposed to the light. However, since the liquid is not flowing, the liquid is not exiting the outlet. However, according to this exemplary embodiment, when the liquid starts flowing again, the light from the ultraviolet source can turn back on, thereby purifying the liquid before the liquid exits the channel.

Figure 9:
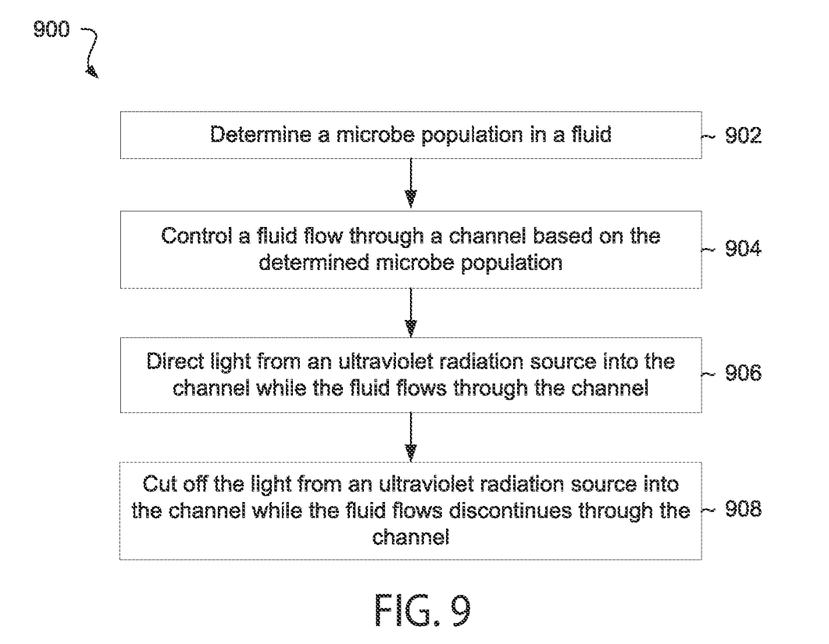
FIG. 9 is a flow chart illustrating an example of a method of using a purification system in accordance with aspects of the present disclosure.

FIG. 9 shows a flowchart illustrating a method 900 of purifying a liquid. The operations of method 900 can be implemented by the purification system described in FIGS. 1-7 or their components, as described herein. In some examples, the purification system can execute a set of codes to control the components of the device to perform the functions described below. Additionally or alternatively, the purification system, appliances, or other devices can perform aspects the functions described below using special-purpose hardware. In this example, the method 900 includes determining a microbe population in a liquid 902, controlling a liquid flow through a channel in a thermally conductive material based on the determined microbe population 904, directing light from an ultraviolet radiation source into a channel in a thermally conductive material while the liquid flows through the channel 906, and cutting off the light from the ultraviolet radiation source into the channel while the liquid flow discontinues through the channel 908.

At block 902, a microbe population can be determined in a liquid. The microbe population can be determined through sensors that measure a characteristic of the liquid such as an optical opacity, a rheology, a surface tension, a response characteristic of the liquid, another type of characteristic, or combinations thereof. The liquid can be located in a reservoir outside of the thermally conductive body, within the channel of the thermally conductive body, another location, or combinations thereof.

At block 904, a flow of liquid through the channel can be controlled. In those circumstances where the microbe population is determined to be potentially high, the flow through the channel can be caused to be slower than a predetermined flow rate to provide additional light exposure to the liquid. In another situation where the microbe population is determined to be low, the flow can be caused to be faster, thereby allowing the liquid to flow through the channel at a faster rate. In some examples, the flow rate control can have different flow rates at which the liquid can pass through the channel. The flow rates can each correspond to a predetermined microbe population range.

While this example has been described as determining a microbe population, in some examples, the purification methods and systems do not involve determining a characteristic about a microbe population within the liquid. In some examples, the method and systems do not involve determining any characteristic of the liquid. In some examples, the liquid is assumed to have a microbe population at a predetermined amount and the liquid is subjected to the conditions that kill off a microbe population at that intensity whether or not the liquid has a population of that intensity or not. Further, while some of the examples above have been described as having more than one flow rate through when the liquid can pass through the channel, in some examples, the liquid can flow through the channel at just a single predetermined flow rate. This flow rate can be consistent with an assumption that the liquid has a predetermined microbe population intensity. Also, while some of the examples above have identified multiple light intensities from the radiating energy source, in some examples, the system is capable of imposing just one intensity level of light when the liquid is flowing. Further, the microbe population can be substantially killed off in a single pass or the liquid can be recirculated so that the microbe population can be killed off over the course of multiple passes through the radiating energy. In some examples, when the microbe population is determined to be high, the fluid can be caused to recirculate additional times without changing the intensity of the radiating energy source or the flow rate. In other examples, when the microbe population is determined to be low, the number of times that the liquid is caused to be recirculated can be reduced.

Figure 10:
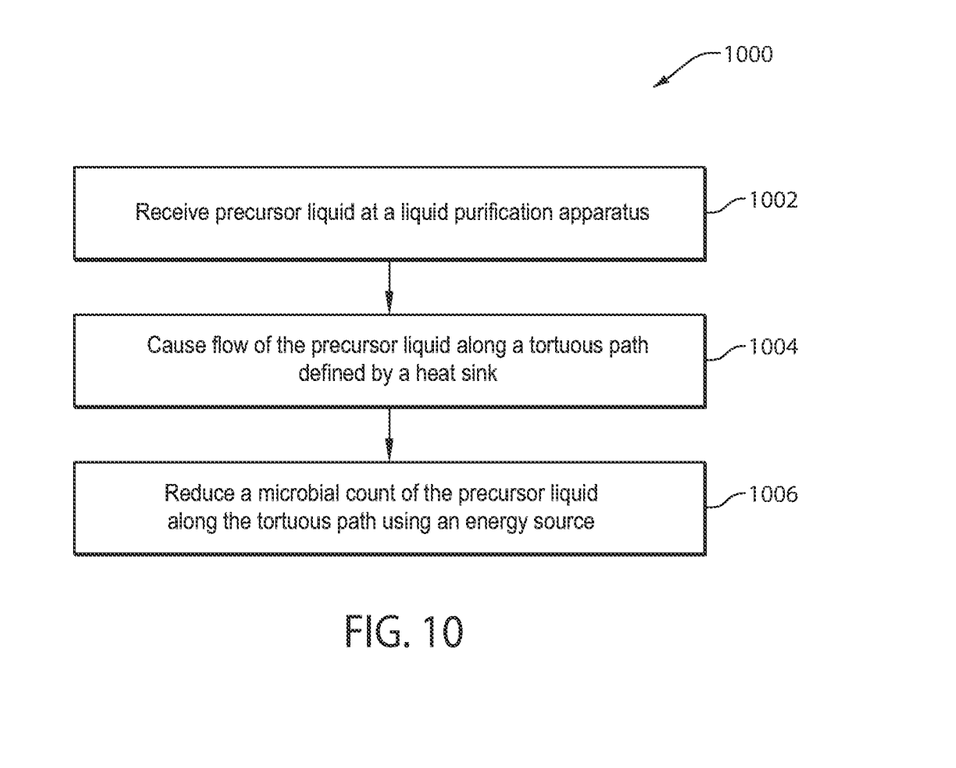
FIG. 10 is another flow chart illustrating an example method of treating precursor liquid in a beverage machine.

FIG. 10 shows a flow chart illustrating a method 1000. The method 1000 is generally directed to treating a precursor liquid. The operations of method 1000 can be implemented by any of the purification systems described in FIGS. 1-7 or their components as described herein. Broadly, the method 1000 is used to both remove heat from a precursor liquid and reduce a microbial count of the liquid. In this manner, the method 1000 can be implemented within a beverage machine or appliance, described herein, and improve the quality of water used in the formation of a beverage machine.

With reference to chart of FIG. 10, at block 1002, a flow of a precursor liquid can be received at an opening of a liquid purification apparatus 200. For example and as shown in FIG. 2, a precursor liquid can be received in the inlet 204 of the liquid purification apparatus 200. The precursor liquid can originated from a reservoir within a beverage appliance and/or be sourced forma plumbed connection directly attached to the liquid purification apparatus 200. The liquid purification apparatus 200 can generally be housed within or partially within a beverage appliance.

At block 1004, the precursor liquid can flow through a tortuous path of the liquid purification apparatus. The tortuous path can be at least partially defined by a heat sink. For example and with reference to FIG. 3, the precursor liquid can generally be caused to flow along the channel 202. As explained herein, the channel can represent a tortuous path that is at least partially defined by the thermally conductive body 201. The precursor liquid travels along the tortuous path of the channel 202, the thermally conductive body 201 can remove at least some heat from the precursor liquid.

At block 1006, a microbial count of the precursor liquid can be reduced along the tortuous path. The microbial count can be reduced using an energy source integrated with the heat sink along the tortuous path. For example and with reference to FIGS. 3 and 4, the energy source 222 can be integrated with the thermally conductive body 201 along the tortuous path of the channel 202. The energy source 222 can emit energy into the precursor liquid along the tortuous path, causing a reduction in the microbial count of the precursor liquid traveling along the tortuous path.

It should be noted that the methods described above describe possible implementations and that the operations and the steps can be rearranged or otherwise modified and that other implementations are possible. Furthermore, aspects from two or more of the methods can be combined.

Information and signals described herein can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

The various illustrative bodies and modules described in connection with the disclosure herein can be implemented or performed with a general-purpose processor, a DSP, an ASIC, an FPGA or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices (e.g., a combination of a digital signal processor (DSP) and a microprocessor, multiple microprocessors, one or more microprocessors in conjunction with a DSP core, or any other such configuration).

The functions described herein can be implemented in hardware, software executed by a processor, firmware, or any combination thereof. If implemented in software executed by a processor, the functions can be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions can also be physically located at various positions, including being distributed, so that portions of functions are implemented at different physical locations.

Computer-readable media includes both non-transitory computer storage media and communication media including any medium that facilitates transfer of a computer program from one place to another. A non-transitory storage medium can be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. In some examples, the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. A portable medium, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein can be applied to other variations without departing from the scope of the disclosure. Thus, the disclosure is not limited to the examples described herein, but is to be accorded the broadest scope consistent with the principles and novel features disclosed herein.

What is claimed is:

1. A liquid purification apparatus, comprising:
a heat sink at least partially defining a tortuous channel for a precursor liquid, the tortuous channel comprising a first portion, a bend extending from the first portion at an angle that is less than 90 degrees from a flow direction of the first portion, and a second portion extending from the bend; and
an energy source integrated with the heat sink and configured to introduce energy to the precursor liquid along the tortuous channel.

2. The liquid purification apparatus of claim 1, wherein the angle of the bend is less than 70 degrees from the flow direction of the first portion.

3. The liquid purification apparatus of claim 1, wherein the heat sink at least partially defines a liquid inlet fluidly coupled to the first portion and a liquid outlet fluidly coupled to the second portion.

4. The liquid purification apparatus of claim 3, wherein the liquid inlet, the tortuous channel, and the liquid outlet are at least partially defined by a recess formed in the heat sink.

5. The liquid purification apparatus of claim 4, further comprising a thermally conductive cover arranged with the heat sink and enclosing the liquid inlet, the tortuous channel, and the liquid inlet.

6. The liquid purification apparatus of claim 5, wherein the thermally conductive cover comprises a substantially flat surface configured to form a volume with the recess.

7. The liquid purification apparatus of claim 4, wherein the heat sink comprises a one-piece structure.

8. The liquid purification apparatus of claim 1, wherein the heat sink further comprises a thermally conductive body.

9. A liquid purification apparatus, comprising:
a thermally conductive body;
a thermally conductive cover, the thermally conductive cover and the thermally conductive body cooperating to define a tortuous channel for a precursor liquid, wherein the tortuous channel is defined by recesses defined by each of the thermally conductive body and the thermally conductive cover; and
an energy source integrated with the thermally conductive cover configured to introduce energy to the precursor liquid along the tortuous channel.

10. The liquid purification apparatus of claim 9, wherein the grooves or recesses are configured to route the precursor liquid along multiple directions within the liquid purification apparatus.

11. The liquid purification apparatus of claim 10, wherein:
the precursor liquid advances along the multiple directions serially; and
each direction of the multiple directions extends at an angle of less than 90 degrees from a serially adjacent direction of the multiple directions.

12. The liquid purification apparatus of claim 9, wherein the thermally conductive cover:
defines a cavity extending through a complete thickness of the thermally conductive cover and connected to the tortuous channel; and
comprises an optically transparent window in the cavity, wherein the energy source is secured to the thermally conductive cover and configured to transmit energy to the precursor liquid through the optically transparent window.

13. A liquid purification apparatus, comprising:
a thermally conductive body comprising a heat sink defining a path for a precursor liquid between an inlet and an outlet of the thermally conductive body, the path comprising at least one bend formed in the heat sink and configured to change a direction of the precursor liquid by less than 90 degrees; and
a purification component integrated with the thermally conductive body configured to reduce a microbial count of the precursor liquid along the path.

14. The liquid purification apparatus of claim 13, wherein the bend is a portion of a spiral section of the path for the precursor liquid.

15. The purification apparatus of claim 13, wherein purification component comprises an energy source having a light source configured to emit ultraviolet radiation.

16. A beverage appliance comprising:
a liquid purification apparatus including:
a thermally conductive body comprising a heat sink defining a path for a precursor liquid between an inlet and an outlet of the thermally conductive body, the path comprising at least one bend formed in the heat sink and configured to change a direction of the precursor liquid by less than 90 degrees; and
a purification component integrated with the thermally conductive body configured to reduce a microbial count of the precursor liquid along the path; and
a valve configured to control a circulation of the precursor liquid along the path.

17. The beverage appliance of claim 16, further comprising a pump configured to cause the precursor liquid to circulate along the path.

18. The beverage appliance of claim 16, further comprising:
a processor; and
a memory in communication with the processor and containing programmed instructions that, when accessed, cause the processor to active the purification component when the precursor liquid is flowing along the path.

* * * * *